UNITED STATES PATENT OFFICE.

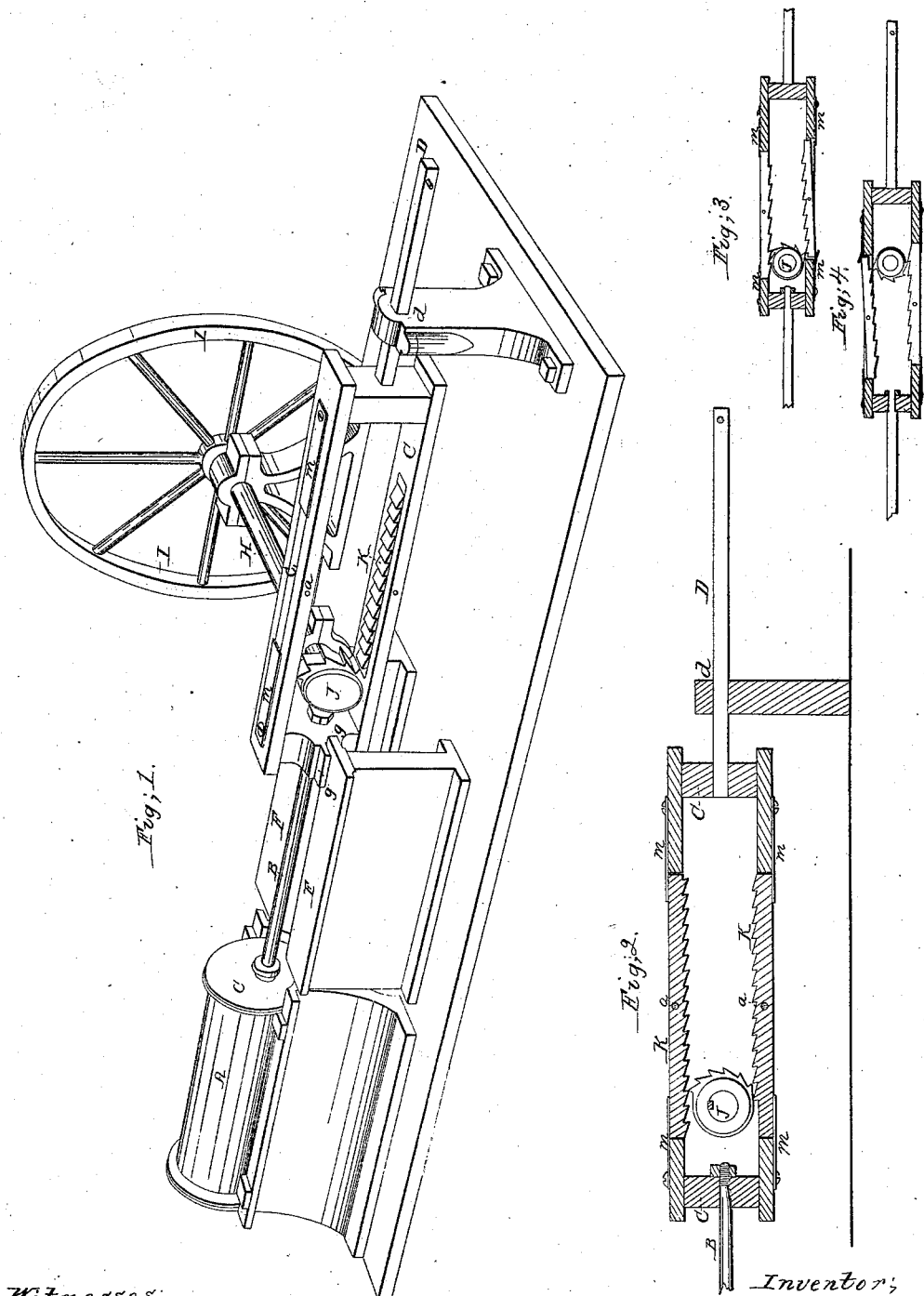

G. W. RICHARDSON AND R. GLOVER, OF GRAYVILLE, ILLINOIS, ASSIGNORS TO THEMSELVES, AND JNO. I. TANQUERRY, OF WHITE COUNTY.

CONVERTING RECTILINEAR INTO ROTARY MOTION.

Specification of Letters Patent No. 23,002, dated February 15, 1859.

*To all whom it may concern:*

Be it known that we, G. W. RICHARDSON and R. GLOVER, of Grayville, in the county of White and State of Illinois, have invented a new and useful Improvement in Converting Rectilinear into Rotary Motion; and we do declare that the following is a full and clear description thereof, reference being had to the accompanying drawings and the letters of reference marked thereon, making part of this specification.

Our invention relates to the peculiar arrangement of parts, by means of which we are enabled to dispense with the use of the crank and pitman in producing rotary motion. The said result being effected by means of alternate racks, with a segment wheel between them. Said racks being pivoted at their centers to a working frame as hereinafter described and specified.

By reference to the accompanying drawings Figure 1 represents a perspective view, showing the parts arranged in such manner as to be operated by the piston shaft of a horizontal engine. Fig. 2 shows a section of the working frame, racks, and segment wheel. Figs. 3 and 4 are views of the same, showing the working frame, and racks in two positions.

(A) is the piston, lying horizontally.

(B) is the piston rod, which is connected with the working frame (C), the opposite end of this frame being supported by a guide rod (D) which works in a bearing (*d*) placed at a proper distance from the piston head (*e*) to allow the frame (C) to have free motion.

(F, F) are horizontal slide rests, on which the slides (*g, g*) run.

(H) is a shaft extending at right angles to the frame (C) on which is arranged the fly wheel (I). This shaft has on its opposite end a segment wheel (J) having teeth or cogs only upon one half its periphery. These teeth all incline one way, similar to the ratchet teeth.

(K, K) are alternate racks pivoted at their centers at (*a, a*) to the frame (C), the teeth of which incline in opposite directions and face each other, so as to receive the teeth of the segment wheel (J) as the frame (C) reciprocates.

When the frame (C) is in the position shown in Figs. 1, and 3, and the piston rod is forced in, drawing the frame (C) with it, the teeth of the segment wheel, (I) catch into the lower rack, by means of which the wheel (I) is made to turn half a revolution, when the piston stroke is reversed the teeth of the wheel (I) take into the upper rack, and thus produce another half revolution of the segment wheel; and as the frame (C) moves forward and backward, a complete rotary motion is produced, which completely does away with the crank motion. In the reciprocating motion of the frame (C) the teeth of the segment wheel (I) will come in contact with the teeth of both racks (K K) as it passes the last tooth, as shown in Figs. 3 and 4. To prevent this contact from breaking the machinery, the racks are pivoted at their centers, to the frame (C) so that they may have a rocking motion and are provided with flat springs (*m, m, m, m*) attached to the frame (C) at the ends of the racks (K K) arranged in such manner as to always keep the racks in gear with the segment wheel, and at the same time allow them to retract, as the segment wheel makes its revolution, so that its teeth may pass, alternately the ends of the upper and lower racks as before described.

When it is desired to apply water, instead of steam power, the shaft of the water wheel, must run through the segment wheel, and as the same is made to rotate, reciprocating motion will be given to the carriage or frame.

We are aware that segment wheels have been used to operate a working frame, and "vice versa," hence we do not claim this device, but

What we claim as our invention and desire to secure by Letters Patent is—

The arrangement of the rocking racks (K, K) in combination with the segment wheel (I) substantially as herein described for the purposes set forth.

In testimony of which invention we have hereunto set our hands.

GEORGE W. RICHARDSON.
ROBERT GLOVER.

Witnesses:
S. J. ORANGE,
H. T. KRAMER.